United States Patent
Herrero et al.

(10) Patent No.: US 12,427,677 B2
(45) Date of Patent: Sep. 30, 2025

(54) METHOD AND SYSTEM FOR CONTROL OF A VERTICALLY TRANSLATABLE ROBOT

(71) Applicant: Mytra, Inc., South San Francisco, CA (US)

(72) Inventors: Elena Galbally Herrero, San Francisco, CA (US); Mikael Jorda, San Francisco, CA (US)

(73) Assignee: Mytra, Inc., Brisbane, CA (US)

( * ) Notice: Subject to any disclaimer, the term of this patent is extended or adjusted under 35 U.S.C. 154(b) by 0 days.

(21) Appl. No.: 19/046,366

(22) Filed: Feb. 5, 2025

(65) Prior Publication Data

US 2025/0249603 A1    Aug. 7, 2025

Related U.S. Application Data

(60) Provisional application No. 63/645,628, filed on May 10, 2024, provisional application No. 63/549,861, filed on Feb. 5, 2024.

(51) Int. Cl.
| | |
|---|---|
| B25J 15/00 | (2006.01) |
| B25J 9/16 | (2006.01) |
| B65G 1/127 | (2006.01) |
| B65G 1/137 | (2006.01) |

(52) U.S. Cl.
CPC ......... *B25J 15/0033* (2013.01); *B25J 9/1607* (2013.01); *B65G 1/127* (2013.01); *B65G 1/1371* (2013.01)

(58) Field of Classification Search
CPC ..... B25J 15/0033; B25J 9/1607; B65G 1/127; B65G 1/1371
See application file for complete search history.

(56) References Cited

U.S. PATENT DOCUMENTS

| | | | |
|---|---|---|---|
| 4,285,249 A | 8/1981 | Kume | |
| 4,541,297 A | 9/1985 | Fujita | |
| 6,598,708 B2 | 7/2003 | St-germain et al. | |
| 2014/0182977 A1 | 7/2014 | Chen | |
| 2021/0170583 A1 | 6/2021 | Edsinger et al. | |
| 2023/0158685 A1* | 5/2023 | Lin ........................... | G06T 3/40 |
| | | | 700/260 |
| 2024/0183428 A1 | 6/2024 | Ozog et al. | |

FOREIGN PATENT DOCUMENTS

| | | |
|---|---|---|
| CN | 105598942 B | 6/2018 |
| CN | 109099128 A | 12/2018 |
| CN | 114536346 B | 4/2023 |
| CN | 115561004 B | 4/2023 |
| DE | 102005006475 B3 | 5/2006 |
| GB | 2059540 A | 4/1981 |

OTHER PUBLICATIONS

Clark, et al., "System and Method for Unified Material Storage and Transportation", U.S. Appl. No. 19/205,835, filed May 12, 2025.

* cited by examiner

*Primary Examiner* — Jeffrey Donels
(74) *Attorney, Agent, or Firm* — Jeffrey Schox; Evan Myers

(57) ABSTRACT

A method for control of a vertically translatable robot includes collecting a set of data associated with a robot; processing the set of data with a set of control algorithms to produce a set of operational parameters; and operating the robot according to the set of operational parameters. The method functions to facilitate control of the vertically translatable robot.

20 Claims, 7 Drawing Sheets

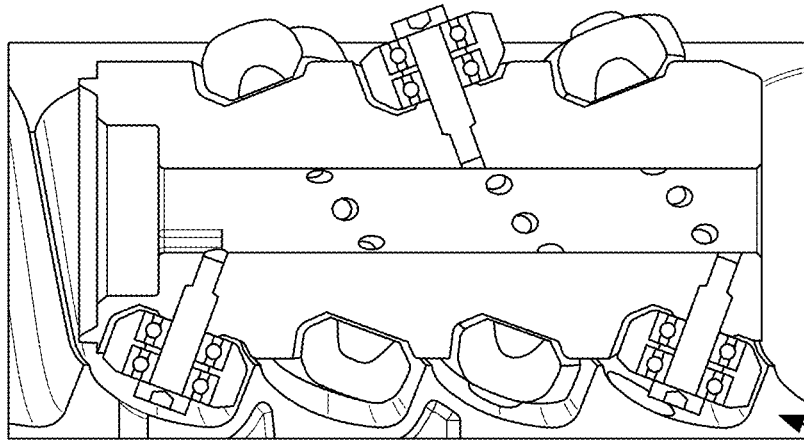
FIGURE 4C — Helical rack
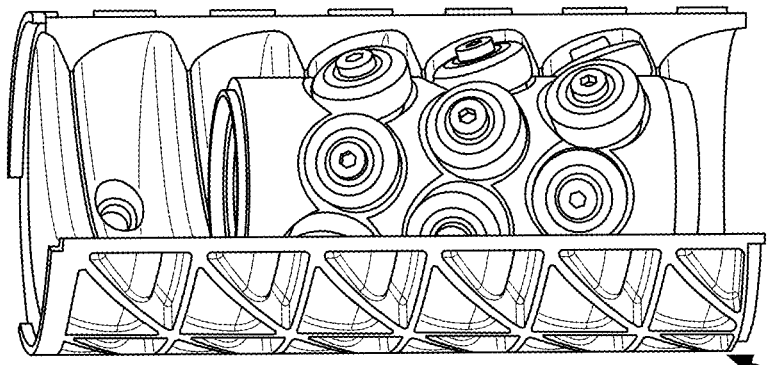
FIGURE 4B — Helical rack
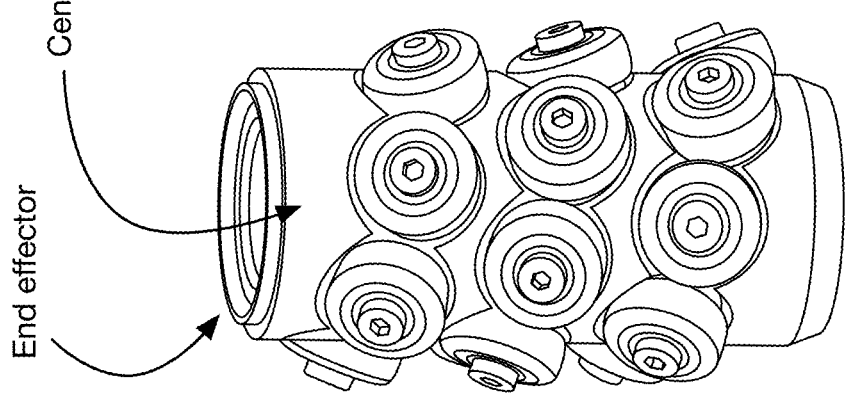
FIGURE 4A — End effector, Central axis of rotation

METHOD AND SYSTEM FOR CONTROL OF A VERTICALLY TRANSLATABLE ROBOT

CROSS REFERENCE TO RELATED APPLICATIONS

This application claims the benefit of U.S. Provisional Application No. 63/645,628, filed 10 May 2024, and U.S. Provisional Application No. 63/549,861, filed 5 Feb. 2024, and each of which is incorporated herein in its entirety by this reference.

TECHNICAL FIELD

This invention relates generally to the robotics and storage automation fields, and more specifically to a new and useful system and method for control of a vertically translatable robot in the robotics and storage automation fields.

BRIEF DESCRIPTION OF THE FIGURES

FIGS. 4A-4C depict a variant of a helical end effector of a robot arm.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
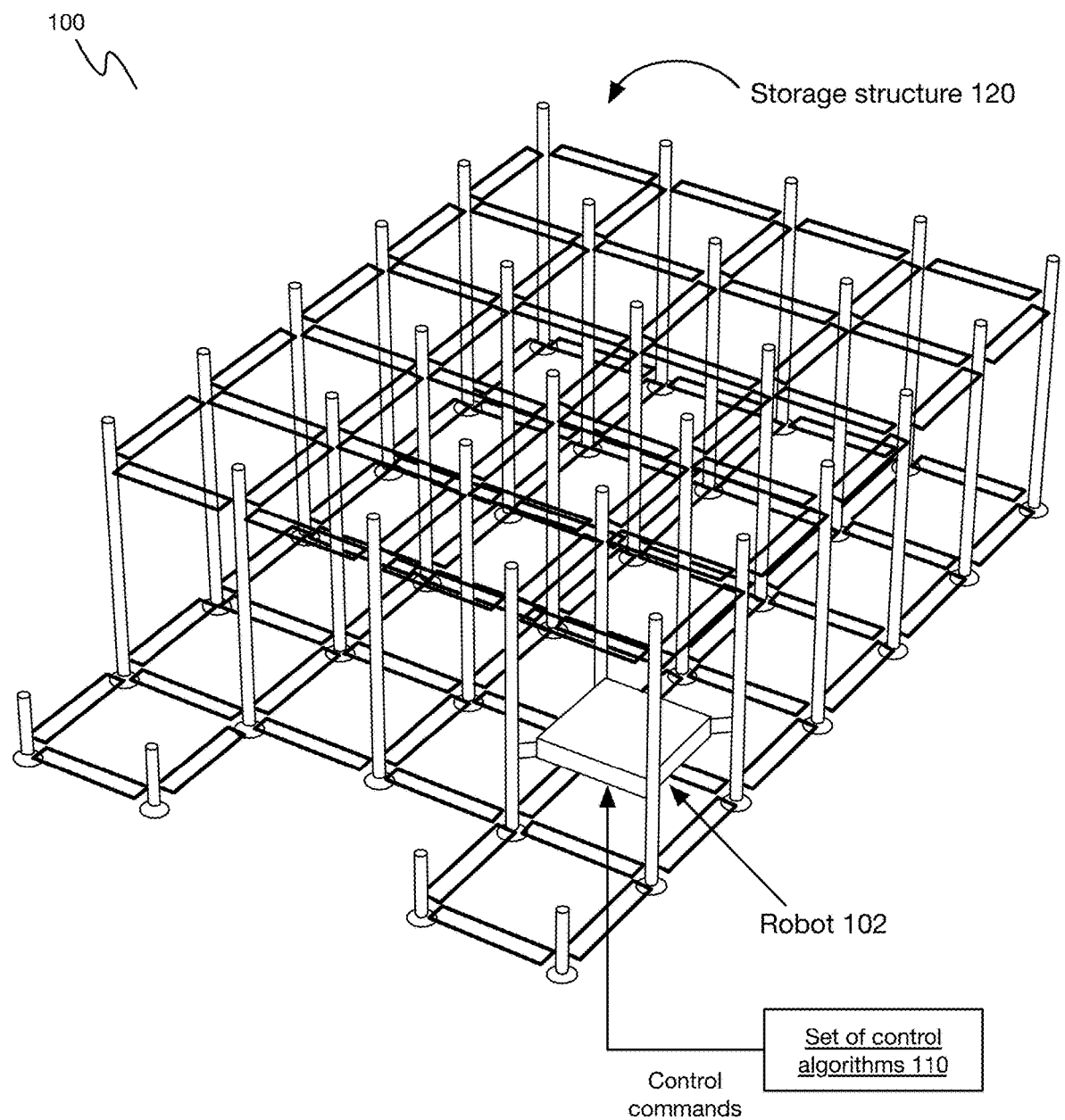
FIGS. 1A-1B depict a schematic of a system for control of a vertically translatable robot.
Figure 1B:
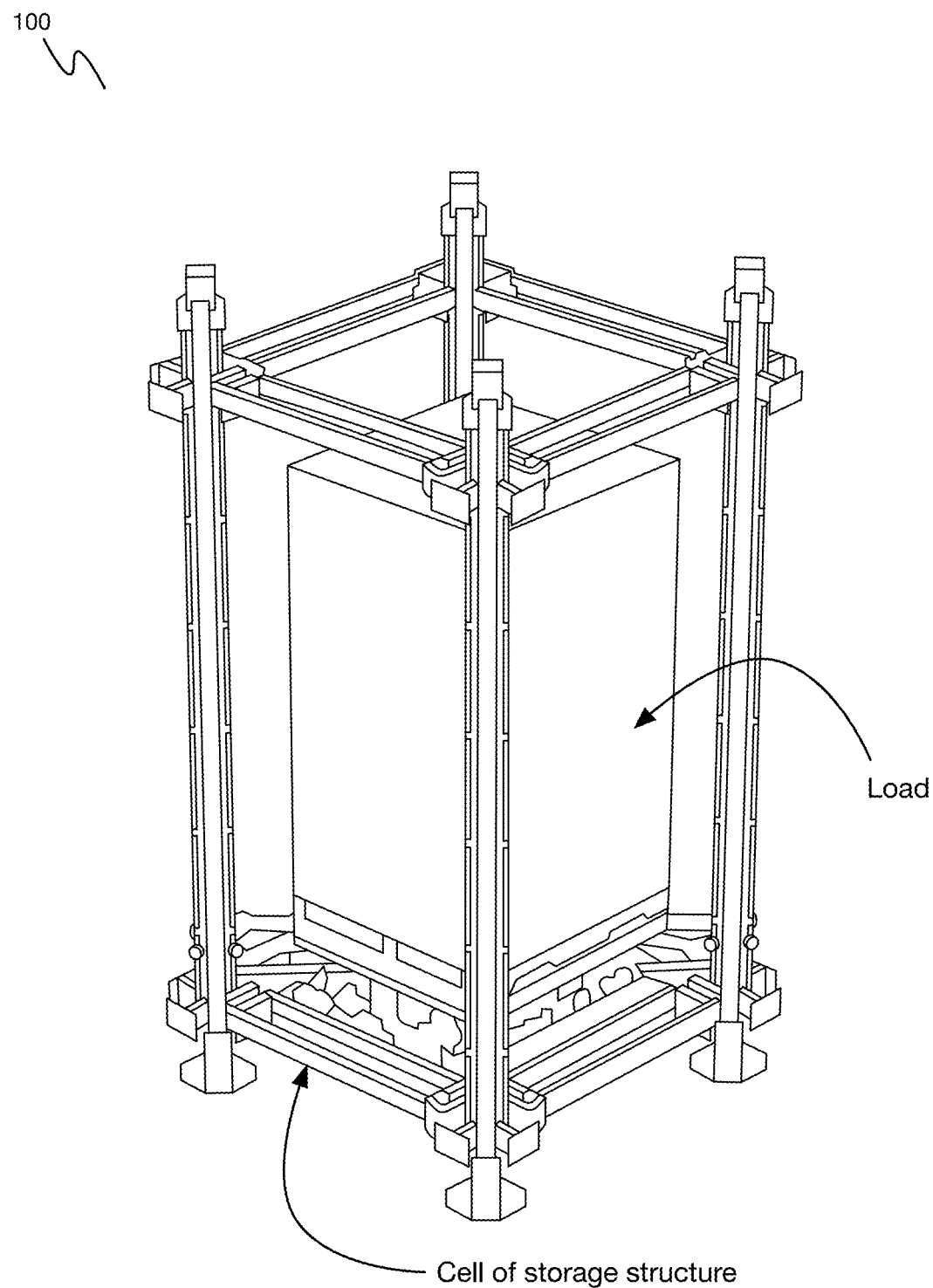

As shown in FIGS. 1A-1B, a system 100 for control of a vertically translatable robot includes and/or interfaces with a set of one or more control algorithms (equivalently referred to herein as control equations). Additionally or alternatively, the system can include and/or interface with a set of robots, a storage structure, and/or any other components. Further additionally or alternatively, the system 100 can include and/or interface with any or all of the components as described in: U.S. application Ser. No. 18/493,278, filed 24 Oct. 2023, and U.S. application Ser. No. 18/531,184, filed 6 Dec. 2023, each of which is incorporated in its entirety by this reference.

Figure 2:
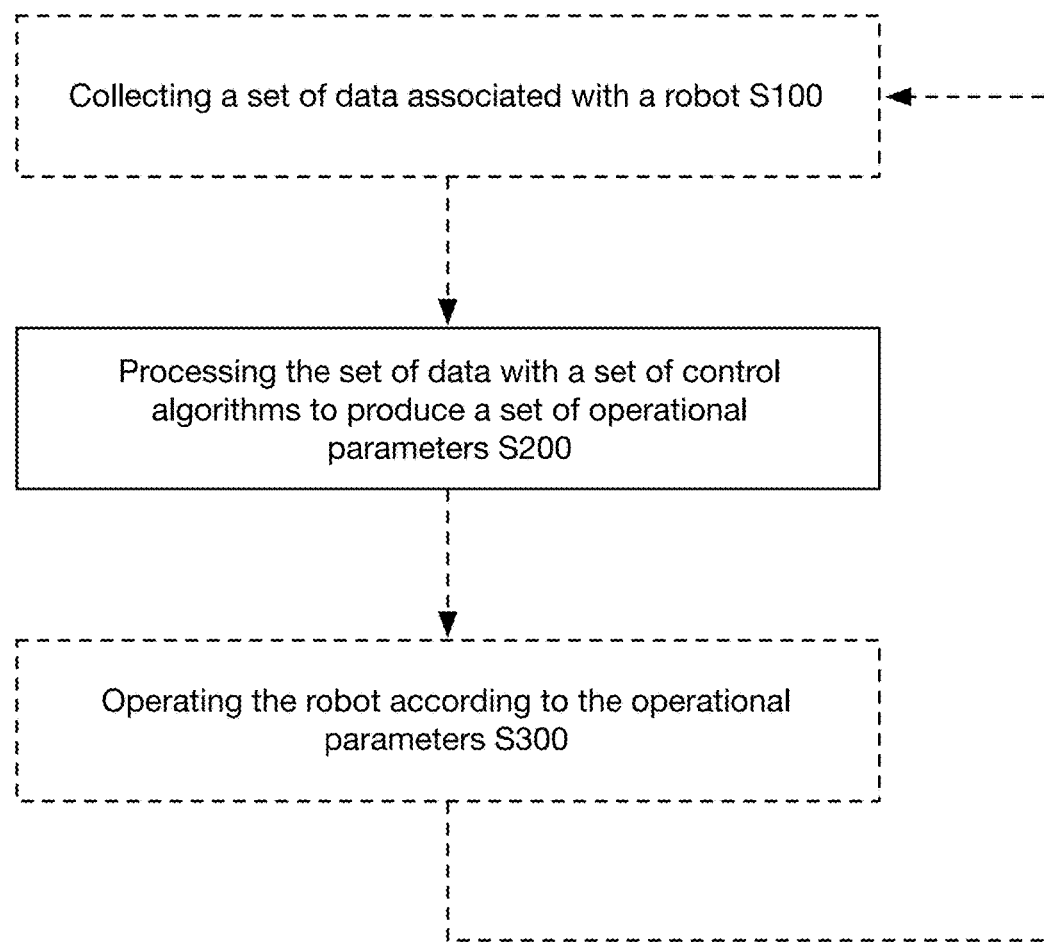
FIG. 2 is a schematic of a method for control of a vertically translatable robot.

As shown in FIG. 2, a method 200 for control of a vertically translatable robot includes collecting a set of data associated with a robot; processing the set of data with a set of control algorithms to produce a set of operational parameters; and operating the robot according to the set of operational parameters. Additionally or alternatively, the method 200 can include any or all of the processes described in U.S. application Ser. No. 18/493,278, filed 24 Oct. 2023, and U.S. application Ser. No. 18/531,184, filed 6 Dec. 2023, each of which is incorporated in its entirety by this reference, or any other suitable processes performed in any suitable order. The method 200 can be performed with a system as described above and/or any other suitable system.

Further additionally or alternatively, the system 100 can include and/or interface with any or all of the components as described in: U.S. application Ser. No. 18/493,278, filed 24 Oct. 2023, and/or U.S. application Ser. No. 18/531,184, filed 6 Dec. 2023, each of which is incorporated in its entirety by this reference. Additionally or alternatively, the method can include any or all of the processes described in U.S. application Ser. No. 18/493,278, filed 24 Oct. 2023, and/or U.S. application Ser. No. 18/531,184, filed 6 Dec. 2023, each of which is incorporated in its entirety by this reference, or any other suitable processes performed in any suitable order. The method 200 can be performed with a system as described above and/or any other suitable system.

The term "drive" and/or "drive mechanism" may be interchangeably utilized herein to refer to an electric drivetrain (e.g., an electric drivetrain, including a traction/drive motor and power transmission components, gearboxes, etc.) and/or independent submodules thereof (e.g., for a split electric drivetrains with no mechanical coupling/differential, etc.), but can additionally or alternatively refer to any suitable tractive drive systems, powertrains/drivetrains, and/or power transmission schemes.

The term "substantially" as utilized herein can mean: exactly, approximately, within a predetermined threshold or tolerance, and/or have any other suitable meaning.

1.1 Illustrative Examples

A robot can include: a chassis, a computing system onboard the chassis, and a sensor suite communicatively coupled to the controller. The robot can include a plurality of orthogonal drive mechanisms (e.g., X-drive, Y-drive, Z-drive, etc.) controlled by an onboard computing system (and/or a controller thereof). The vertical drive mechanism can be articulated between a retracted configuration and a deployed/engaged configuration by a (respective) set of deployment mechanisms, such as linear actuators. In an example, a vertical drive mechanism(s) can be deployed at the corners of the chassis (e.g., deployed outward beyond a rectangular footprint defined by the lateral drive mechanisms and/or a planar intersection of the Y-drive mechanism travel and X-drive mechanism travel) using a spring-loaded linear actuator. Additionally, the robot can selectively deploy (i.e., disengage) and/or retract (i.e., engage) a payload and/or support tray thereof.

The robot can include any suitable degrees of actuation freedom, which can include: Z-drive actuation (e.g., at each arm), Z-drive deployment (and retraction) actuation, and/or any other suitable degrees of freedom. Each degree of freedom can include a single actuator/mechanism or multiple (independent) actuators/mechanisms (e.g., two, four, etc.; a pairs of actuators, multiple pairs of actuators, etc.). In one example, the Z-drive can include a plurality of drive mechanisms (e.g., respective helical drive mechanism at each corner of the vertical footprint or column; four substantially parallel Z-drive axes) which can be independently actuated/controlled (e.g., simultaneously controlled to facilitate Z traversal while substantially maintaining chassis orientation). In a first example, the robot can include four Z-drive actuators (e.g., all same-handed helical drives; two right-hand helical drives and two left-hand helical drives, paired diagonally or otherwise), each with a respective (linear) deployment actuator. In variants, the robot and/or degrees of actuator freedom thereof (or a subset thereof) can be rotationally symmetric about a vertical axis (e.g., 180 degree rotation, 90 degree rotation, etc.), mirrored about a midsagittal plane, mirrored about a (mid-) frontal plane, mirrored about a (diagonal) reference plane (e.g., defined by parallel rotational axes of opposite Z-drives, etc.), and/or can define any other suitable symmetry (ies).

However, the robot can include any other suitable degrees of freedom and/or can be otherwise configured.

1.2 Variants

In a first set of variants, a method for a vertical translation of a robot comprises: autonomously controlling actuation of a plurality of arms to maintain compressive contact between a helical drive mechanism, at a distal end of each arm, and a set of helical racks; and concurrently with controlling actuation of the plurality of arms; receiving proprioception data from each helical drive mechanism of the plurality of arms; based on the proprioception data and a target velocity, determining control instructions for the plurality of helical drive mechanisms by inverse-kinematics using a velocity-space grasp matrix; and controlling actuation of a plurality of helical drive mechanisms, along the set of helical racks, according to the control instructions.

In one or more variants of the first set, the velocity-space grasp matrix constrains the sum of all rotations of the plurality of helical drive mechanisms to zero. Additionally, one or more variants of the first set further comprise: estimating a geometric center of the robot based on a respective position of each arm of the plurality, wherein the velocity-space grasp matrix is based on a geometric center of the robot.

In one or more variants, the respective position of each arm of the plurality is determined based on force-feedback. For example, each arm of the plurality can a spring.

In one or more variants, control instructions for the plurality of helical drive mechanisms are independent of the force-feedback.

In one or more variants, each of the plurality of helical drive mechanisms are controlled independently of the actuation of the plurality of arms.

In one or more variants, the method further comprises: based on the proprioception data, estimating a vertical position of the robot, wherein the autonomous actuation of a plurality of arms is based on the vertical position of the robot.

In one or more variants, the method further comprises: while autonomously controlling actuation of the plurality of arms to maintain compressive-contact between the helical drive mechanisms and the helical rack: calibrating the robot relative to a reference surface. For example, the reference surface comprises a superior surface of a support structure, wherein the set of helical racks are mounted to the support structure.

Additionally or alternatively, in one or more variants calibrating the robot comprises: determining a robot pitch angle and a robot roll angle while the robot is supported by the superior surface; while maintaining the robot pitch angle and the robot roll angle, preloading each of the plurality of arms by actuating each helical drive; and after preloading each of the plurality of arms, determining a reference rotation of each helical drive mechanism of the plurality. Additionally, in one or more variants controlling actuation of the plurality of helical drive mechanisms according to the control instructions comprises maintaining the robot pitch angle and the robot roll angle within a threshold tolerance.

In one or more variants, the plurality of helical drive mechanism comprises a first pair of helical drive mechanisms, at opposing ends of a first diagonal of the robot, and a second pair of helical drive mechanisms, at opposing ends of a second diagonal of the robot. For example, the second pair of helical drive mechanisms are counter-rotating relative to the first pair (e.g., wherein the sum of rotations is constrained to be zero, which may avoid imparting a net 'twist' moment on the support frame and/or rack structure about the center of the robot). As a second example, the first pair of helical drive mechanisms are actuated, along the first diagonal, by a respective pair of arms of the plurality of arms, wherein the second pair of helical drive mechanisms are actuated, along the second diagonal, by a respective pair of arms of the plurality of arms.

In a second set of variants, nonexclusive with the first, a method comprises: with a set of sensors onboard a robot, determining a set of sensor data comprising force-feedback data and encoder data; using a feedback controller based on the force-feedback data, automatically controlling linear actuation, along an actuation axis, of a spring-loaded arm; and independently of the automatic control of the spring-loaded arm: based on a target velocity for the robot, determining control instructions for a helical drive mechanism using an inverse-kinematic model; and autonomously controlling the helical drive mechanism, along a vertical rack, according to the control instructions. In variants, the control instructions are mathematically decoupled from the force-feedback data and the feedback controller.

In variants, the inverse-kinematic model is based on the geometric center of the robot, wherein the geometric center of the robot is estimated based on a position of the helical drive mechanism along the actuation axis (i.e., deployed length along the actuation axis, under spring compression). The inverse-kinematic model preferably constrains the body motion and each helical drive, but can additionally or alternatively constrain the collective motion of the helical drive(s), and/or can be otherwise configured.

In variants, the inverse-kinematic model constrains the rotation of the helical drive mechanism relative to the rotation of a remainder of helical drive mechanisms onboard the robot.

However, the system and/or method can be otherwise used or configured.

2. Benefits

Variations of the technology can afford several benefits and/or advantages.

First, variants of the technology confers the benefit of providing efficient and stable vertical movement of a robot in a storage structure, which can in turn enable large loads (e.g., greater than 1000 kg) to be transported by the robot in a robust manner for storage, retrieval, and/or other tasks associated with a warehouse. In examples, a set of control algorithms are designed and utilized that minimize tilt of the robot, thereby enabling the robot to travel in a smooth and reliable manner vertically along the storage structure.

Second, variants of the technology can reduce hardware requirements of the robot required for efficient and stable robotic movement, such as not requiring certain supplementary sensors to be used as input data in any or all control algorithms. In examples, for instance, any or all control algorithms are operable based on encoder information from the actuators onboard the robot.

Third, variants of the technology can facilitate high speed control and/or vertical motion of the robot to facilitate high speed and/or throughput within the storage structure. In particular, variants can utilize inverse-kinematic 'whole body' control approaches in a motion-space or velocity-space to yield a computationally-efficient, closed form control representation (e.g., velocity-space grasp matrix) which respects a variable geometric center of the robot (i.e., where the geometric center changes as a function of arm deployment position).

Additionally or alternatively, the system and method can confer any other benefit.

3. System 100

As shown in FIGS. 1A-1B, a system 100 for control of a vertically translatable robot 102 includes and/or interfaces with a set of one or more control algorithms 110. Additionally or alternatively, the system can include and/or interface with a set of robots 102, a storage structure 120, and/or any other components.

The system 100 functions to control the movement of a robot 102 throughout a storage structure, and preferably further functions to control the movement of the robot—and any load(s) (e.g., packages) being carried by the robot—in an efficient, robust, and safe manner. Additionally or alternatively, the system 100 can function to: prevent slippage of the robot and/or load(s) carried by the robot; increase an allowable weight of a load that the robot can carry relative to conventional systems; and/or otherwise confer any other advantages.

The system 100 is preferably configured to control movement of the robot in at least a vertical direction, as in a direction aligned with gravity (equivalently referred to herein as a z-direction), but can additionally or alternatively be configured to move the robot along x- and y-directions, along multiple directions (e.g., in 3D space), and/or can otherwise suitably control movement of the robot.

3.1 System-Robot

The system 100 can interface or include a set of one or more robots 102, wherein the robots can, individually and/or collectively, function to transport and/or store load(s) (equivalently referred to herein as materials and/or goods) within a storage structure. Additionally or alternatively, the robots can function to transport materials between storage structures, and/or perform any other suitable functions.

Figure 3A:
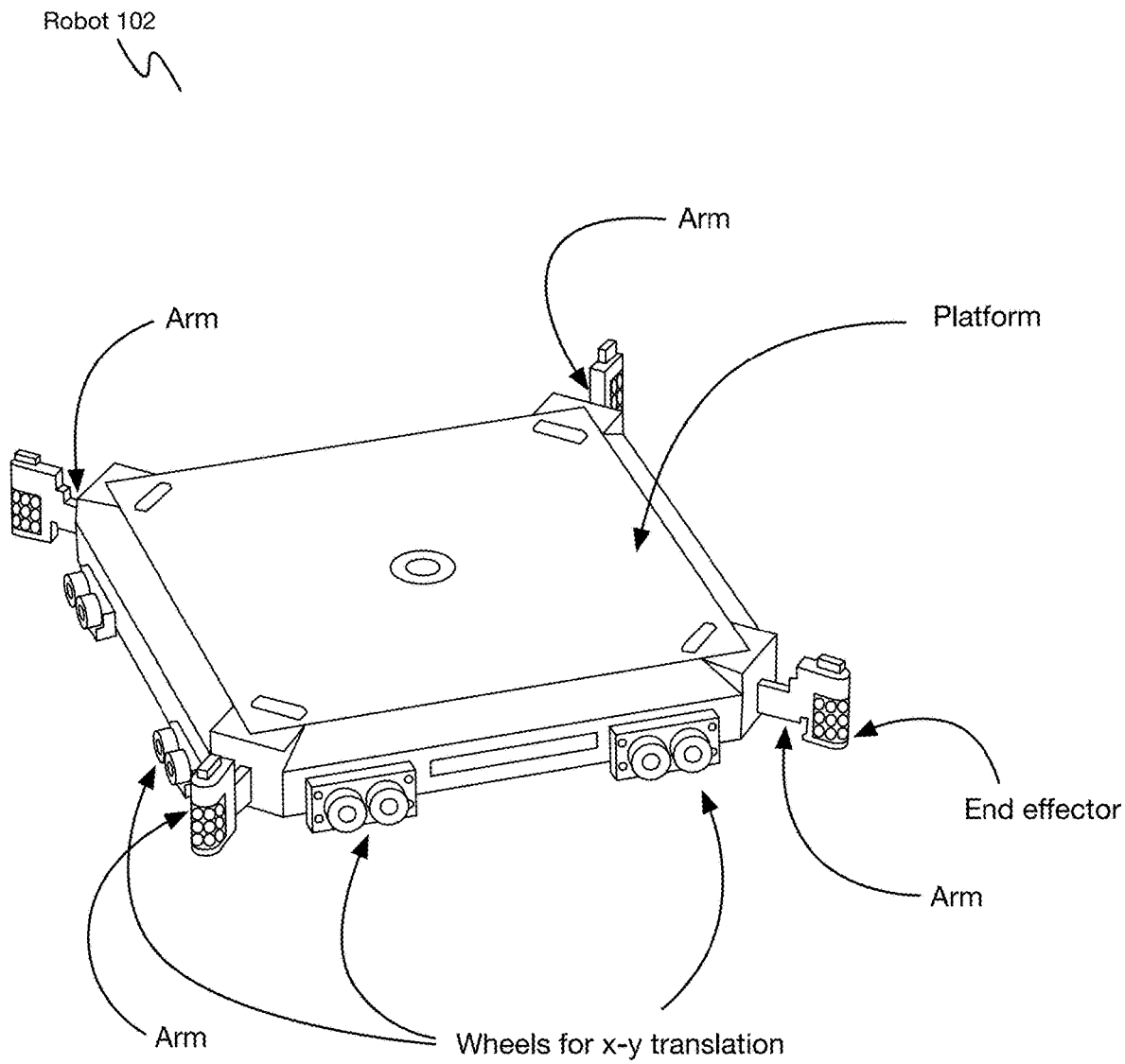
FIGS. 3A-3C depict a variant of the robot and associated modeling of the robot.

The robot preferably includes and/or defines a broad surface, equivalently referred to herein as a platform (e.g., as shown in FIG. 3A), where the platform functions to support the materials during movement, storage, and/or at any other times. Additionally, the robot can define a full or partial enclosure to contain materials, a cavity, and/or any other suitable features for containing material(s).

The robot preferably defines and/or includes a set of extendable and/or retractable arms (e.g., bars, linkages, appendages, etc.), wherein the arms function to enable smooth and controlled movement of the robot through the storage structure. This can include smooth and controlled vertical movement. Additionally or alternatively, the arms—by retracting and/or extending—can function to: enable transitions between directions of movement, such as between vertical movement and horizontal movement; enable transitions between different cells of a storage structure (e.g., retracting arms to fit between boundaries of neighboring cells); and/or otherwise facilitate movement of the robot within the storage structure.

In preferred variants, the robot includes multiple arms, where the multiple arms are controlled according to a set of control algorithms (e.g., as described below) and can be: independently controllable (e.g., during vertical movement, during horizontal movement, etc.); collectively controllable (e.g., during horizontal movement); and/or otherwise suitably controlled.

Each of the arms preferably includes and/or defines one or more end effectors at a distal portion of the arm, where the end effector(s) function to engage with and move along a vertical structure (e.g., helical rack) of the storage structure. In preferred variants, each of the end effectors includes a helical drive that is rotatable about its central axis, this rotation causing vertical movement of the robot. In examples (e.g., as shown in FIGS. 4A-4C), the helical drive includes a helical arrangement of ball bearing rollers that engage with grooves of a complementary rolling surface on a helical rack (e.g., as shown in FIGS. 4B-4C), where rotation of the helical drive about its central axis causes linear translation of the arm along the helical rack. In a specific example (e.g., as shown in FIG. 4C) each of the ball bearing rollers is tilted with respect to the central axis, which functions to increase a surface area of contact between the rollers and the helical rack, which can function to decrease and/or prevent slippage. Additionally or alternatively, the arms can include any other suitable end effectors.

Figure 3B:
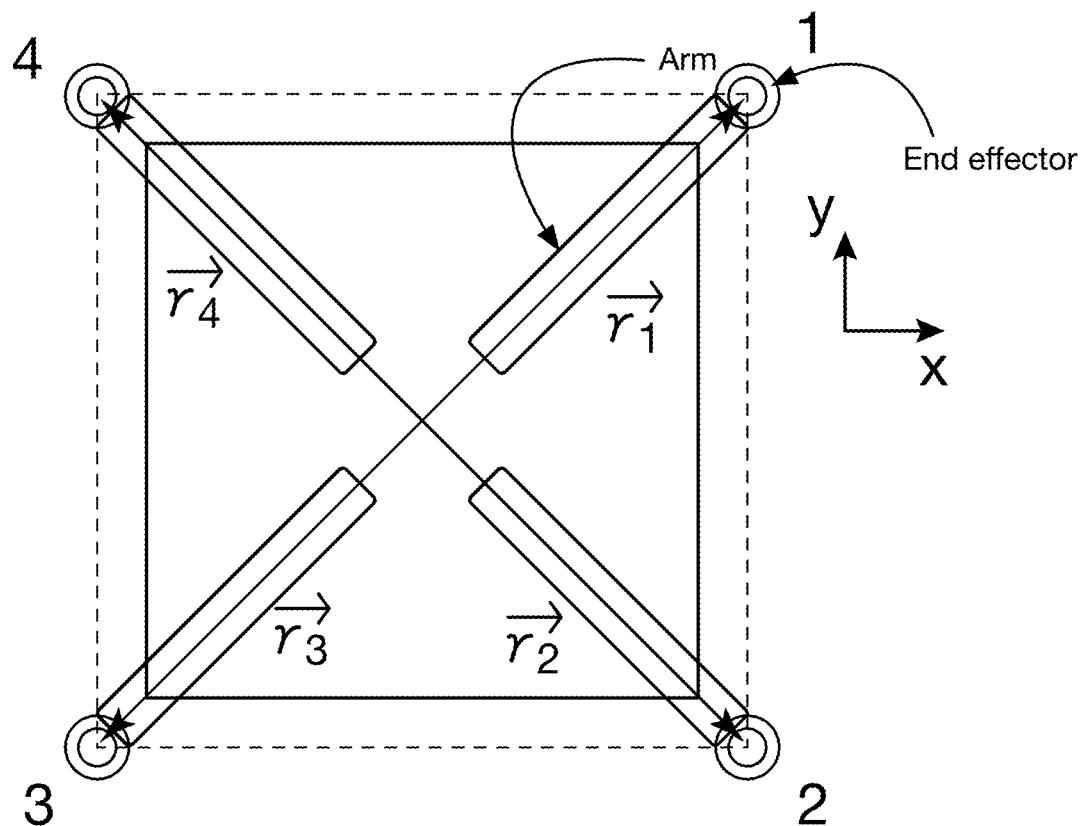
Figure 3C:
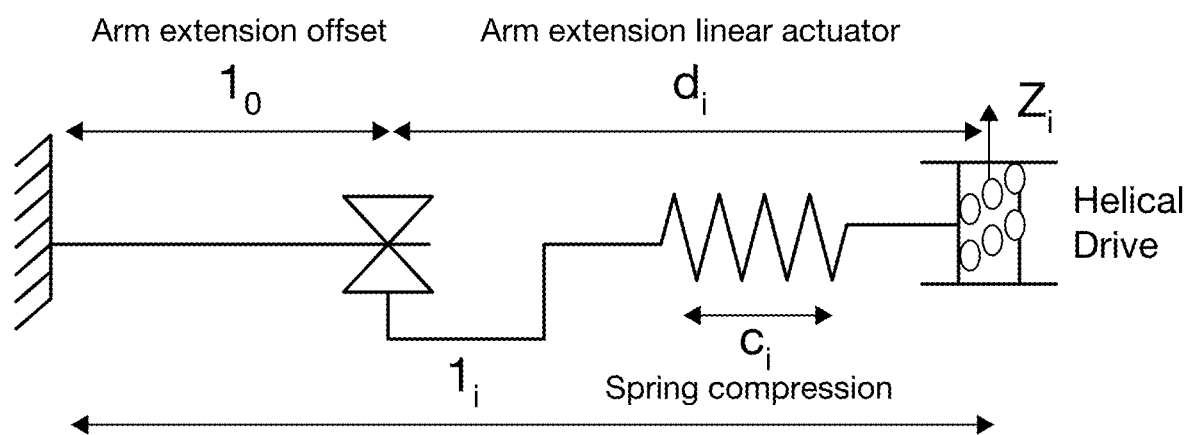

In a set of examples (e.g., as shown in FIGS. 3A-3C), the robot includes 4 arms, wherein the axes defined by each of the arms intersect along a central axis of a platform of the robot. Each arm is preferably extendable and retractable such that a wheel or other end effector coupled to the end of the arm can change its position in space. Additionally or alternatively, the robot can include any other number of arms, arms defined at other orientations, and/or the robot can be otherwise suitably configured.

The robot preferably includes a set of actuators (e.g., motors, linear motors, rotary motors, etc.), where the actuators preferably function to enable each arm to move with 2 degrees of freedom. In preferred variants, for instance, each arm includes a linear actuator configured to enable retraction and extension of the arm, and a rotary motor (equivalently referred to herein as a helical drive) configured to rotate an end effector of the arm, which enables vertical climbing of the robot within the storage structure (e.g., as described below). Additionally or alternatively, the robot can include any suitable actuators.

The robot can optionally include a set of springs (e.g., 1 per arm) (e.g., as shown in FIG. 3C), equivalently referred to herein as lateral springs, which can function to: cushion the end effectors against minor perturbations during movement; enable normal forces between the end effector and storage structure to be maintained during movement; enable measurement of normal forces to be determined (e.g., and used as inputs in a set of control algorithms); and/or enable any other functions. In specific examples, for instance, each arm includes one or more pre-loaded lateral springs that provide built-in passive compliance and apply normal force against helical racks of the storage structure.

In variants, the arms are preferably controlled independently of the helical drive to maintain compression against the racks. For example, the arms and/or springs therein are preferably actuated using feedback controls (e.g., force feedback controller, such as a PID control scheme), independent of the vertical motion and/or helical drive controls. Additionally or alternatively, the arms can be actuated and/or controlled based on a relative position of the robot along the racks (e.g., independent of velocity), controlled with the helical drives stationary (e.g., as part of a calibration and/or deployment sequence), controlled with the helical drives in motion, and/or can be otherwise suitably controlled.

The robot can optionally include any number of other components, such as: horizontal movement mechanisms (e.g., wheels as shown in FIG. 3A) that can be used to move along tracks in x-y planes of the storage structure, and/or any other components.

In a preferred set of variants (e.g., as shown in FIGS. 3A-3C), the robot includes and/or defines: a platform configured to support a set of materials; a set of arms configured to enable smooth and controlled vertical movement of the robot in a storage structure, each of the arms including a rotatable end effector; a set of linear actuators and springs that enable retraction and extension of the arms; a set of rotary actuators that enable rotational movement of the end effectors; and/or any other components.

Additionally or alternatively, the robot can include any other components.

The robot can include or be used in sensor suite which functions to collect measurements to facilitate actuation controls and can additionally function to facilitate autonomous perception/navigation of the robot. The sensor suite can include: proprioception sensors, actuator encoders, internal sensors (e.g., encoders, actuator sensors, accelerometers, gyroscopes, IMU, INS, temperature sensors, voltage/current sensors, etc.), environmental sensors, antennas (e.g., GPS, cellular, Bluetooth, Wi-Fi, Near Field Communication, etc.), drive mechanism sensors (e.g., encoders, cameras, time-of-flight sensors, voltage/current sensors, accelerometers, force sensors, contact sensors, etc.; inboard and/or outboard ends, such as encoders at both the actuator and the wheel), wheel encoders, deployment mechanism sensors (e.g., position sensing, spring feedback sensing, spring force sensors, etc.), payload sensors (e.g., force sensors/switches, cameras, proximity sensors, payload envelope sensors, payload engagement sensors, etc.), perception suite sensors (e.g., cameras, time-of-flight sensors, proximity sensors, radar, Lidar, etc.; support frame sensors, etc.), integrated actuator sensors, and/or any other suitable set of sensors. The sensors can include one or more: Radar sensors, LIDAR sensors, cameras, camera arrays, time-of-flight sensors, time-of-flight arrays, spatial sensors, location sensors, force sensors, on-board diagnostic sensors (such as vehicle mechanism sensors), audio sensors, barometers, light sensors, temperature sensors, current sensors, voltmeters, contact sensors, proximity sensors, vibration sensors, ultrasound sensors, electrical sensors, pressure sensors, and/or any other suitable sensors. However, the robot can include any other suitable sensors.

In variants, one or more sensors of the sensor suite and/or perception suite thereof can be arranged on each end/corner of the robot (e.g., front, back, left, right; top and bottom; along diagonals, etc.) and/or oriented along each actuation axis of the vehicle.

In variants, the sensor suite can include a set of helical drive sensors (e.g., arranged at an outboard/actuated drive end of the arm actuation mechanism) at each helical drive mechanism. For example, the Z-drive sensors can include: contact sensors (e.g., which physically contact the rack structure) and/or non-contact sensors (e.g., cameras, light sensors, optical sensors, laser imaging sensors, time-of-flight sensors, etc.) configured to facilitate alignment and/or engagement of the helical drive mechanism with the frame structure (e.g., helical drive interface). Sensors can be used to provide feedback on (and/or estimate) the arm position and/or geometric center of the robot. Additionally, sensors can provide sensing of coordinate position (e.g., position along the vertical axis; or higher order derivatives thereof: velocity, acceleration, jerk, etc.), incline angle (e.g., pitch, roll, etc.), and/or any other suitable parameters.

The sensor suite can facilitate odometry and/or localization relative to frame features (e.g., cells and/or coordinate positions therein; helical rack geometry; fiducials; etc.), dead reckoning, and/or can otherwise facilitate localization within the frame structure and/or along a vertical axis or vertical cell array thereof. The sensors are preferably communicatively coupled to the computing system to facilitate perception and/or control. For instance, the sensor suite can be configured to collect data at various frequencies and/or resolutions, depending on the specific requirements of the operating environment. The collected data can be processed and analyzed in real-time (or near real time) to inform the autonomous decision-making and control at the computing system.

However, the system can include any other suitable sensor suite and/or any other suitable sensor(s).

The system can include or be used in conjunction with a computing system, which can include a central computer and/or a plurality of actuator controllers. The computing system and/or various computing operations thereof can be centralized, distributed (e.g., modularized), local/onboard, remote and/or otherwise implemented. The computing system preferably controls actuation based on sensor feedback (e.g., CAN/LIN network communications) and/or facilitate I/O communication (e.g., with a remote server, remote/centralized planner, cloud computing resources, external data storage, HMI control system, etc.). The computing system and/or the controller(s) thereof can include: one or more: CPUs, GPUs, custom FPGA/ASICS, microprocessors, servers, cloud computing, and/or any other suitable components. The controllers and/or elements of the computing system can be communicatively coupled in series, parallel, and/or any combination thereof (e.g., parallel/star configuration). However, the computing system can be otherwise configured.

The computing system can receive sensory inputs/measurements from the sensor suite, which can be used to determine a vehicle state and dynamically control the system 100 based on the vehicle state. For example, the computing system can control deployment mechanisms to effect system configuration change(s) and/or control the drive system(s) based on the vehicle state.

In variants, the computing system is preferably an autonomous computing system which facilitates navigation along a trajectory received (wirelessly) from a remote computing system (e.g., a remote planner, tele-operator, etc.). For example, the computing system can be configured to autonomously navigate along a target (vertical) velocity profile or path. Additionally or alternatively, the computing system can function to implement external navigation commands, teleoperation commands (e.g., received from a remote teleoperator), autonomous collision avoidance/control, and/or any other system controls. The computing system can include a battery management system (BMS), actuator controllers (e.g., motor inverter, hydraulic/pneumatic controllers, etc.), and/or any other suitable components. The computing system is preferably onboard the chassis (e.g., mounted to the chassis, etc.), but can additionally or alternatively include one or more remote computing elements and/or distributed/cloud processing elements. The computing system can be centralized (e.g., packaged within a single module), distributed (e.g., across multiple compute nodes, packaged within multiple compute modules, etc.), and/or can be otherwise configured. However, the system can include or be used with any other suitable computing system(s).

The system can optionally include or be used with a support tray, which functions to support a payload (e.g., cargo container) within the frame support structure. The support tray is preferably passively actuated (e.g., no onboard controller system(s) and/or actuators; engaged and/or actuated by a deployment mechanism of the robot), but can additionally or alternatively be actively controllable (e.g., onboard deployment mechanisms), separately actuated (e.g., externally), substantially rigid, and/or can be otherwise configured. As an example, one or more engagement features at a superior surface of the system can mechanically couple the system to a support tray and/or facilitate deployment of the support tray (e.g., via an onboard deployment mechanism). However, the system can include any other suitable components.

3.2 System—Storage Structure

The system can include and/or interface with a storage structure, which functions to support the robot, and define and enable its movement in multiple directions.

Each robot is preferably able to move in 3 dimensions (e.g., x-, y-, and z-directions) throughout the storage structure. Additionally alternatively, the storage structure can enable other movement, limit (e.g., selectively limit) certain movements, and/or otherwise facilitate storage and/or transit of materials.

The storage structure preferably defines a frame, such as through the construction and attachment of multiple cells (e.g., as shown in FIG. 3B), where the robot can move horizontally between cells through the deployment and retraction of sets of wheels (e.g., as shown in FIG. 3A).

Figure 5:
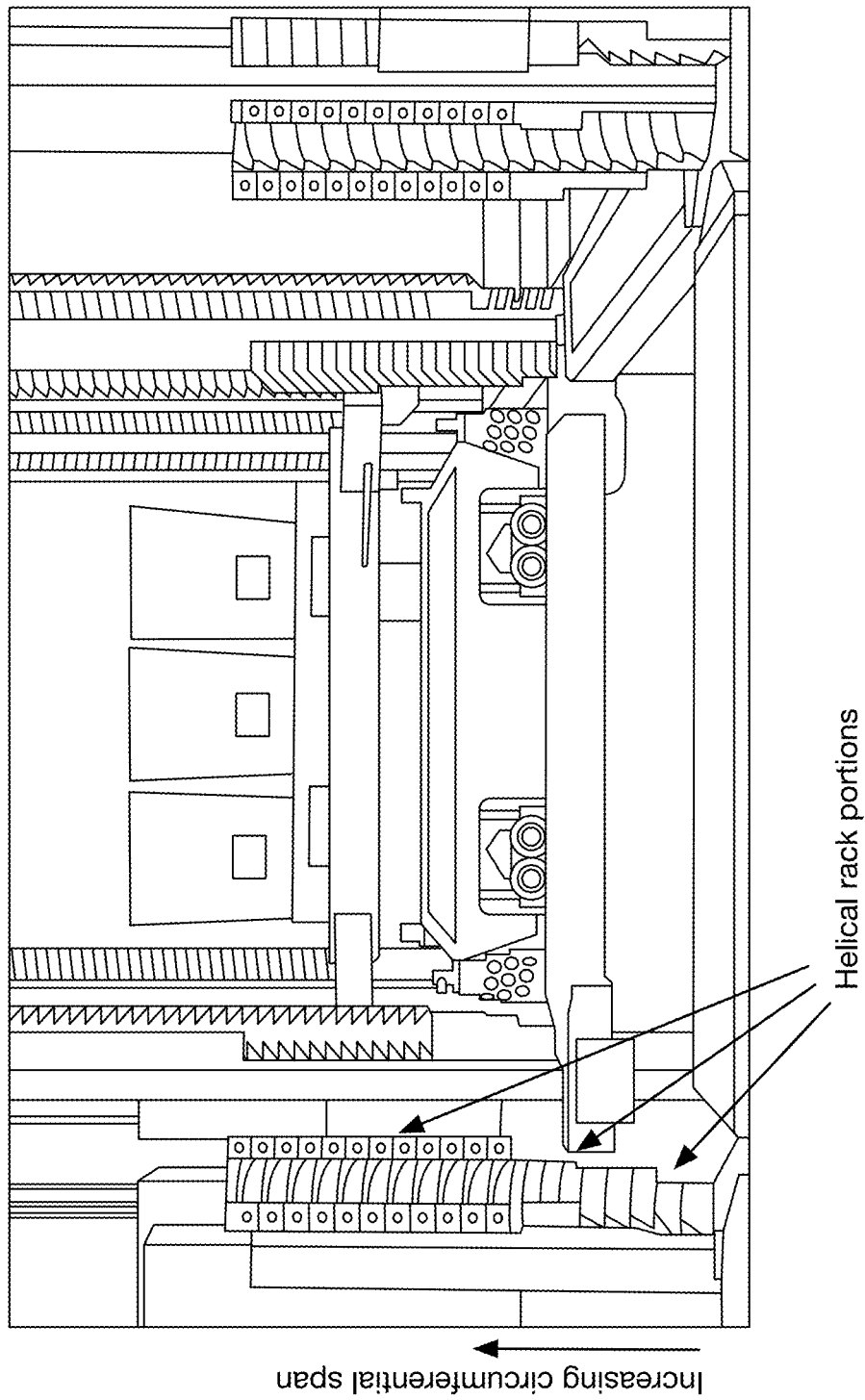
FIG. 5 depicts an example of a robot engaged in a storage structure.

Additionally, the storage structure further preferably defines helical racks along columns of the frame (e.g., as shown in FIG. 5), where the helical racks enable vertical translation of the robot(s) and can additionally function to: prevent slippage of the robot relative to the helical rack; promote smooth translation of the robot; and/or perform any other functions. In some variants, the helical racks define varying circumferential angles (equivalently referred to herein as circumferential span) along their lengths. For example, the helical racks can have a smallest circumferential span at the end where the robot enters the helical rack (which enables the arms of the robot to enter and engage with the helical rack), where the circumferential span increases (e.g., gradually, in a stepped fashion, etc.) along its length, which functions to contain the robot once it is engaged. A specific example is shown in FIG. 5. The control algorithm(s) can further be configured to utilize these differences in circumferential span (e.g., as described below).

3.3 System—Set of Control Algorithms

The system includes a set of control algorithms, which function to control movement of the robot through the support structure. Additionally, the control algorithms can function to ensure load stability of the robot, prevent tilt of the robot during vertical movement (e.g., pitch rotation; roll rotation), prevent slippage of the robot during vertical movement, and/or enable any other suitable outcomes. The set of control algorithms preferably can include and/or implement a kinematic model(s) of the robot (e.g., inverse-kinematic controls) and the target relationship using any suitable mapping, relationship, and/or control scheme. For example, the control instructions can be generated using inverse kinematics, feed-forward controls (e.g., linear, non-linear, etc.), feedback controls (e.g., linear, non-linear, etc.), and/or any other suitable control scheme to generate control instructions.

In variants, the control algorithms can implement inverse-kinematic model is based on the geometric center of the robot, wherein the geometric center of the robot is estimated based on a position of the helical drive mechanism along the actuation axis (i.e., deployed length along the actuation axis, under spring compression). For example, the kinematic model implemented by the control algorithm can synchronize vertical motion while the helical drives are automatically controlled engage the vertical racks. The control scheme can implement control objectives which can include: each arm being compressed against the vertical rack (e.g., within a predetermined range of normal force, such as defined by the parameters of the internal spring); the robot constrains maintains orientation (i.e., pitch and roll); and the robot follows a target velocity profile. Additionally, the rotational velocity of all helical drives can be constrained to sum to zero to prevent internal force buildup in the robot or frame.

The set of control algorithms can control movement of the robot in a single direction (e.g., vertically along a vertical axis), multiple directions (e.g., along parallel vertical axes, in conjunction with 3D routing/translation, etc.), and/or any combination of directions.

The set of control algorithms are preferably configured as described below in the method 200, but can additionally or alternatively be otherwise suitably configured.

4. Method 200

As shown in FIG. 2, a method 200 for control of a vertically translatable robot includes collecting a set of data associated with a robot S100; processing the set of data with a set of control algorithms to produce a set of operational parameters S200; and operating the robot according to the set of operational parameters S300. Additionally or alternatively, the method 200 can include any other suitable processes.

The method 200 functions to enable the smooth, safe, and robust transit and storage of materials throughout a storage structure, such as particularly heavy materials (e.g., loads of greater than 1000 kg, loads of up to 3000 kg, loads greater than 3000 kg). This can include, for instance, preventing and/or minimizing tilt (e.g., maintaining a tilt angle of less than a threshold tolerance, such as: 5 degrees, 2 degrees, 1 degree, 0.5 degrees, etc.) of the platform carrying the materials when moving vertically, preventing slippage of the robot while traveling vertically, promoting smooth movement of the robot, enabling the robot to traverse within and among cells of the storage structure, and/or any other functions.

The method 200 is preferably performed with a system 100 as described above, but can additionally or alternatively be performed with any other suitable system(s).

The method 200 is preferably performed continuously throughout at least transit of a robot, but additionally or alternatively, any or all of the method can be performed during static operation of robot, and/or at any other times.

In one set of variants, the method (and/or S100 thereof) can include and/or can be performed responsive to deployment of the helical drives (e.g., by engagement of the arms) against the rack and/or calibrating the robot pose and helical drive orientation relative to the rack. For instance, the orientation and relative rotation of each helical drive mechanism can be pre-calibrated (e.g., prior to execution of the method) and/or calibrated, under pre-loaded deformation of the arms, relative to the frame.

For instance, the plurality of arms can be autonomously controlled to maintain compressive-contact between the helical drive mechanisms and the helical rack with the robot supported against a reference surface (e.g., cell of the support frame and/or a superior surface thereof). The vertical drives can then be actuated vertically (upwards) until the entire weight of the robot is supported by the rack, rather than the reference surface, without changing the orientation of the robot body in (e.g., maintaining the robot pitch angle and the robot roll angle; referencing IMU measurements of other sensor measurements during calibration), thus preloading each of the plurality of arms by actuating each helical drive. With the orientation of the robot fixed (e.g., in pitch and roll), the reference rotation of each helical drive mechanism can used to control vertical translations (e.g., under a no-slip assumption) based on encoder measurements (e.g., alone and/or in conjunction with other sensor modalities).

However, the robot pose and/or drive mechanism rotations can additionally or alternatively be pre-calibrated and/or can rely on any other suitable internal/external references.

4.1 Method—Collecting a Set of Data Associated with a Robot S100

The method 200 can include collecting a set of data associated with a robot S100, which functions to receive information with which to control the system 100 according to a set of control algorithms.

S100 is preferably performed continuously (e.g., at a predetermined frequency, at a predetermined set of intervals, at a random set of intervals, iteratively, repeatedly, etc.) during operation (e.g., transit) of any or all robots (e.g., vertical movement, all movement, etc.), but can additionally or alternatively be performed in response to a trigger (e.g., receipt of a control signal), after a calibration sequence (e.g., preloading arms), collectively for multiple robots, and/or at any other times.

For each robot, the set of data preferably includes proprioception data, and more specifically encoder data from each of the set of actuators of the robot, such as each of the set of linear actuators and rotary motors, along with force feedback data (i.e., spring compression data from a set of force sensors and/or other spring feedback sensors on each arm). Additionally or alternatively, the set of data can include other state information (e.g., velocities, positions, etc.) associated with actuators, sensor suite data, perception data, IMU data, health information associated with one or more components of the robot, and/or any other information.

In a preferred set of variants, the method 200 is able to be performed absent of receiving motion and/or orientation data, such as data from an inertial measurement unit (IMU), which can confer advantages over conventional systems and methods. For example, the arm position can be controlled (and estimated) relying entirely on force-feedback, while the vertical position of the robot and helical drive mechanisms can be controlled entirely based on encoder data. In particular, where the helical drive relies on inverse-kinematic controls (e.g., velocity-space grasp matrix; Jacobian defined by the geometric center and rotation of the helical drives), the helical drive controls may be mathematically decoupled from force-feedback sensing (e.g., as relied upon for arm deployment), which may reduce the sensitivity of the system to the tolerance stacks (i.e., actuators and spring elements outboard of force sensors) and deformations of the structure over large distances/loads.

Additionally or alternatively, any other data can be received in S100.

4.2 Method—Processing the Set of Data with a Set of Control Algorithms to Produce a Set of Operational Parameters S200

The method 200 can include processing the set of data with a set of control algorithms to produce a set of operational parameters S200, which functions to determine the next set of control commands to apply to actuators and/or other components of the robot. Additionally, S200 can function to: achieve a set of movement objectives (e.g., target vertical speed of platform, desired translational speed of robot, etc.); maintain tilt of the robot platform below a predetermined threshold (e.g., 5 degrees, 4 degrees, 3 degrees, 1 degree, etc.); maintain engagement of the robot with the storage structure; and/or otherwise achieve any other desired operation.

S200 is preferably performed in response to S100, but can additionally or alternatively be performed at any other suitable time(s).

S200 is preferably performed during vertical transit of the robot, where at least a portion of the set of control algorithms is configured to achieve a set of objectives associated with the vertical movement. In preferred variants, the objectives of the control algorithms for vertical motion include: maintaining engagement of the robot arms with the helical racks, maintaining a flat configuration of the robot platform (e.g., arranged at less than a predetermined tilt angle) throughout vertical movement, and moving the robot vertically according to a certain velocity (and/or within a range of velocities). Additionally or alternatively, any other suitable objectives can be achieved with control algorithms, such as, but not limited to: moving vertically according to a particular velocity profile (e.g., moving smoothly, accelerating, holding a maximum speed, and decelerating), moving within a range of allowable accelerations, and/or any other objectives.

Further, the control algorithms can be configured to maintain these objectives the event of failure (e.g., loss of power, slipping of one or more arms, etc.), handle wear and/or surface irregularities in hardware of the system (e.g., surface aberrations in helical racks, wear on rollers of end effector, etc.), and/or otherwise enable optimal performance of the system. For example, the robot and/or helical drive mechanisms may be passively stable in the event of power loss (i.e., counter-orientation of adjacent drive mechanisms may passively inhibit/lock free rotation of the helical drive in absence of tractive power).

Additionally or alternatively, any or all objectives can be accounted for with and/or through (e.g., collectively with) components of the system, such as, but not limited to: preventing slipping of the entire robot by having numerous points of contact between the robot end effectors (e.g., through having numerous rollers), tilting rollers of the end effector and the corresponding helical tracks to increase the surface area of contact between the rollers and rack, and/or any other hardware features.

The control commands produced in S200 for vertical motion preferably include commands (e.g., velocities, positions, voltages, current, etc.) for each linear actuator and for each rotary motor of the robot. The linear actuator commands can prescribe the position of each arm (e.g., amount of extension, amount of retraction, etc.), the speed of movement of each arm, and/or any other features associated with the arms. The rotary motor commands can prescribe a speed of rotation for each rotary motor, which in turn produces a speed of vertical movement for the associated arm, where the vertical movement of the arms collectively determined the vertical speed (and positioning) of the robot. Additionally or alternatively, any other commands can be determined.

To produce the control commands, the control algorithm(s) for vertical motion preferably, at least partially, relate motion of the robot arms collectively (e.g., in an interdependent manner). This functions to account for, since the arms can—in preferred variants—be independently controllable, the possibility that one or more arms could be behaving differently than expected due to a variety of factors (e.g., motor heat, unavailable voltage level, etc.). By considering the arms together, the commands that are issued can have increased accuracy through accounting for the collective state of the arms in issuing new commands.

The control algorithms preferably compute a set of actuator velocities including a $1^{st}$ subset of linear velocities to be executed by linear actuators of the robot, and a $2^{nd}$ subset of angular velocities to be executed by rotary motors of the robot. The $1^{st}$ and $2^{nd}$ subsets of velocities are preferably related to each other by a moment arm variable, which is affected by the length at which the corresponding robot arm is extended, retracted, and/or neutrally arranged. For instance, as the length of extension of the robot arm changes, the effect that a particular angular velocity of the end effector has on the robot's vertical velocity changes. The control algorithms preferably take the length of the arms and/or the relationship between arm length and one or more velocities into account.

In addition to achieving one or more motion objectives (e.g., robot vertical velocity), any or all actuator velocities are further preferably determined in accordance with maintaining normal forces between the end effector and the helical rack such that the robot maintains sufficient contact with the storage structure during vertical movement (e.g., to prevent slipping, sliding, falling, etc.). The normal force requirements preferably differ along a length of the helical rack (e.g., decreasing with vertical height, decreasing as circumferential span increases, etc.), but can additionally or alternatively be uniform, all part of a range of allowed values, and/or otherwise suitably specified. In some examples, the set of control algorithms attempt to continuously achieve a same (or similar) normal force among all arms at each point in time.

In examples, S200 includes, at each of a set of temporal intervals (e.g., at a frequency between 50-100 milliseconds), calculating, with a set of equations (e.g., relating all arms together), how each of the set of linear actuators should be operated next, and how each of the rotary motors should be operated next. Inputs to the control algorithm preferably include most recent information (e.g., encoder data, velocities, etc.) associated with the actuators, along with a desired velocity for the robot's vertical motion, but can additionally or alternatively include any other information. In specific examples, for instance, S200 includes computing 8 new velocities—4 linear velocities for motors of a set of linear actuators and 4 angular velocities for rotary motors of the end effectors—at each point in time, where implementing the 8 new velocities is configured to collectively move the platform vertically (e.g., at a predetermined speed, within a predetermined range of acceptable speeds, etc.) with minimal tilt (e.g., less than 5 degrees of tilt).

The control algorithms can optionally include any number of constraints, which can function to: accurately represent physical constraints of the system, result in a unique solution of control commands, and/or confer any other benefits. In some variants, for instance, the control algorithms include a constraint that the robot does not rotate (e.g., about a central axis aligned with gravity) during vertical movement.

Additionally or alternatively, control algorithms for enabling vertical movement of the robot can be otherwise suitably configured.

S200 can optionally additionally include producing control commands for the robot in first engaging with the helical rack, such as when the robot enters the helical rack portion having the smallest circumferential span (and/or while passing through the engagement portion of any other cells within the frame structure). For instance, control algorithms associated with this section can be configured to produce higher normal forces between the end effector and the helical rack, since it is easier for the robot to be initially misaligned and subsequently fall during this portion of the helical rack. In examples, the control algorithms for this section of the helical rack specify holding the end effectors at a fixed distance until the circumferential span increases, where the passive springs can account for any irregularities in helical rack surface. Additionally or alternatively, based on the vertical position of the robot, the arm actuation control may prevent retraction of the arms and/or increase the normal force against the rack (e.g., relative to nominal normal force during vertical drive; exceeding a minimum force threshold) at the engagement portion to prevent disengagement in this regime.

S200 can optionally additionally include producing control commands for any other suitable motion or tasks of the robot, such as, but not limited to: implementing x-y movement through the storage structure. In examples, for instance, the control algorithms can prescribe wheel speeds of the robot, timing of deployment and retraction of wheels (e.g., where wheels are retracted to travel between cells), and/or any other commands.

Additionally or alternatively, S200 can include any other processes and/or be otherwise suitably performed.

4.3 Method—Operating the Robot According to the Operational Parameters S300

The method 200 can include operating the robot according to the operational parameters S300, which functions to operate the actuators of the robot according to control commands produced in S200. Additionally or alternatively, S300 can include any other suitable processes and/or be otherwise suitably performed.

S300 is preferably performed in response to S200, but can additionally or alternatively be performed at any other time(s).

Additionally or alternatively, the method 200 can include any other suitable processes.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for a vertical translation of a robot comprising:
   autonomously controlling actuation of a plurality of arms of the robot to maintain compressive contact between a helical drive mechanism, at a distal end of each arm, and a set of helical racks; and
concurrently with controlling actuation of the plurality of arms:
   receiving proprioception data from each helical drive mechanism of the plurality of arms;
   based on the proprioception data and a target velocity, determining control instructions for the plurality of helical drive mechanisms by inverse-kinematics using a velocity-space grasp matrix; and
   controlling actuation of a plurality of helical drive mechanisms, along the set of helical racks, according to the control instructions.

2. The method of claim 1, wherein the velocity-space grasp matrix constrains the sum of all rotations of the plurality of helical drive mechanisms to zero.

3. The method of claim 1, further comprising: estimating a geometric center of the robot based on a respective position of each arm of the plurality, wherein the velocity-space grasp matrix is based on a geometric center of the robot.

4. The method of claim 3, wherein the respective position of each arm of the plurality is determined based on force-feedback.

5. The method of claim 4, wherein each arm of the plurality comprises a spring.

6. The method of claim 4, wherein the control instructions for the plurality of helical drive mechanisms are independent of the force-feedback.

7. The method of claim 1, wherein each of the plurality of helical drive mechanisms are controlled independently of the actuation of the plurality of arms.

8. The method of claim 1, further comprising: based on the proprioception data, estimating a vertical position of the robot, wherein the autonomous actuation of a plurality of arms is based on the vertical position of the robot.

9. The method of claim 1, further comprising, while autonomously controlling actuation of the plurality of arms to maintain compressive-contact between the helical drive mechanisms and the helical rack: calibrating the robot relative to a reference surface.

10. The method of claim 9, wherein the reference surface comprises a superior surface of a support structure, wherein the set of helical racks are mounted to the support structure.

11. The method of claim 9, wherein calibrating the robot comprises:
   determining a robot pitch angle and a robot roll angle while the robot is supported by the superior surface;
   while maintaining the robot pitch angle and the robot roll angle, preloading each of the plurality of arms by actuating each helical drive; and
   after preloading each of the plurality of arms, determining a reference rotation of each helical drive mechanism of the plurality.

12. The method of claim 11, wherein controlling actuation of the plurality of helical drive mechanisms according to the control instructions comprises maintaining the robot pitch angle and the robot roll angle within a threshold tolerance.

13. The method of claim 1, wherein the plurality of helical drive mechanism comprises a first pair of helical drive mechanisms, at opposing ends of a first diagonal of the robot, and a second pair of helical drive mechanisms, at opposing ends of a second diagonal of the robot.

14. The method of claim 13, wherein the second pair of helical drive mechanisms are counter-rotating relative to the first pair.

15. The method of claim 13, wherein the first pair of helical drive mechanisms are actuated, along the first diagonal, by a respective pair of arms of the plurality of arms, wherein the second pair of helical drive mechanisms are actuated, along the second diagonal, by a respective pair of arms of the plurality of arms.

16. A method comprising:
   with a set of sensors onboard a robot, determining a set of sensor data comprising force-feedback data and encoder data;
   using a feedback controller based on the force-feedback data, automatically controlling linear actuation, along an actuation axis, of a spring-loaded arm; and
   independently of the automatic control of the spring-loaded arm:
      based on a target velocity for the robot, determining control instructions for a helical drive mechanism using an inverse-kinematic model; and
      autonomously controlling the helical drive mechanism, along a vertical rack, according to the control instructions.

17. The method of claim 16, wherein the control instructions are mathematically decoupled from the force-feedback data and the feedback controller.

18. The method of claim 16, wherein the inverse-kinematic model is based on the geometric center of the robot, wherein the geometric center of the robot is estimated based on a position of the helical drive mechanism along the actuation axis.

19. The method of claim 18, wherein the position of the helical drive mechanism is estimated based on force-feedback data.

20. The method of claim 16, wherein the inverse-kinematic model constrains the rotation of the helical drive mechanism relative to the rotation of a plurality of helical drive mechanisms onboard the robot.

\* \* \* \* \*